(12) United States Patent
Drzymala et al.

(10) Patent No.: US 11,461,574 B2
(45) Date of Patent: *Oct. 4, 2022

(54) BIOPTIC READER ASSEMBLY WITH VIDEO UPGRADE MODULE

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/340,923

(22) Filed: Jun. 7, 2021

(65) Prior Publication Data

US 2021/0294999 A1 Sep. 23, 2021

Related U.S. Application Data

(63) Continuation of application No. 16/823,553, filed on Mar. 19, 2020, now Pat. No. 11,080,498.

(51) Int. Cl.
*G06K 7/14* (2006.01)
*H04N 5/225* (2006.01)
*H04N 5/232* (2006.01)

(52) U.S. Cl.
CPC ......... *G06K 7/1413* (2013.01); *H04N 5/2253* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 11,080,498 B1 * | 8/2021 | Drzymala | G06K 7/1413 |
| 2002/0074402 A1 | 6/2002 | Latimer et al. | |
| 2003/0209600 A1 | 11/2003 | Collins, Jr. et al. | |
| 2017/0061180 A1 | 3/2017 | Barkan et al. | |

* cited by examiner

*Primary Examiner* — Kristy A Haupt
(74) *Attorney, Agent, or Firm* — Yuri Astvatsaturov

(57) ABSTRACT

A bioptic reader assembly includes a scale assembly, bioptic barcode reader, and video upgrade module. The scale assembly includes a support frame and a platter and has a width that is less than or equal to 11½ inches. The bioptic barcode reader is mounted to the support frame and includes a lower housing portion positioned below the platter, an upper housing portion extending above the lower housing portion and the platter, and a camera. The video upgrade module is operatively connected to the bioptic barcode reader, is in communication with the camera, and is configured to process and interpret images received from the camera. The video upgrade module is positioned within the width of the scale assembly and within a height defined from a top surface of the platter to a bottom of the lower housing portion, which is preferably less than or equal to 4 inches.

20 Claims, 11 Drawing Sheets

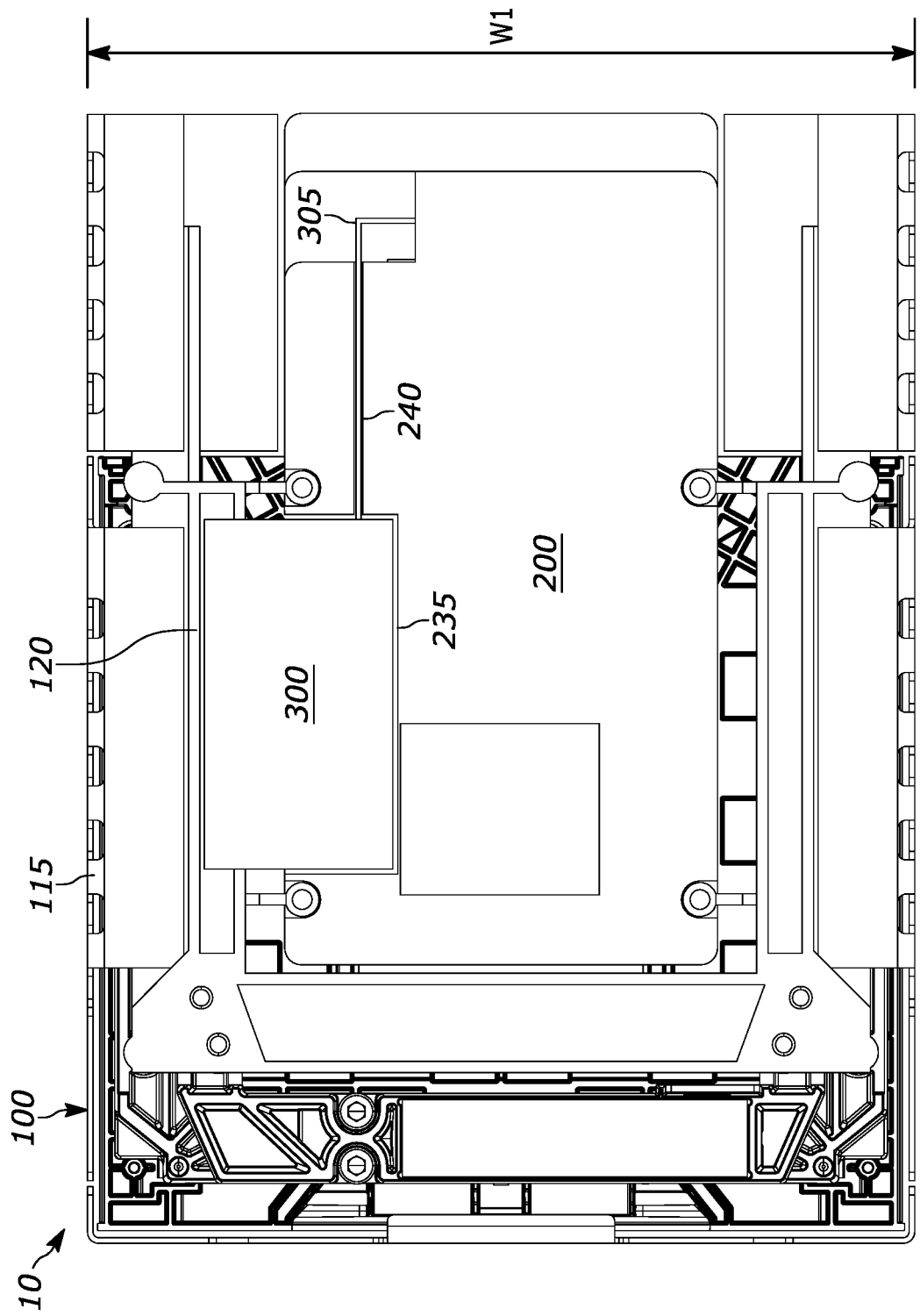

BIOPTIC READER ASSEMBLY WITH VIDEO UPGRADE MODULE

CROSS-REFERENCE TO RELATED APPLICATION

This application is a continuation of U.S. patent application Ser. No. 16/832,553, filed on Mar. 19, 2020, and incorporated herein by reference in its entirety.

FIELD OF THE DISCLOSURE

At least some embodiment of the present disclosure relate generally to barcode reader assemblies and, in particular, to barcode readers having video upgrade modules.

BACKGROUND

Bioptic reader assemblies for use at a point-of-sale typically include a scale assembly for use in weighing products and a barcode reader, such as a bioptic barcode reader, installed with the scale assembly for reading and decoding barcodes displayed on products. In addition to being able to scan product barcodes and weigh products, it could also be beneficial in certain applications for the bioptic reader assembly to have a machine vision capable camera that can be used for object recognition, anti-shrink applications, etc.

However, to use a camera for object recognition, anti-shrink applications, etc., a processing module is required, which must be mounted somewhere, such as underneath a counter or within a compact self-checkout counter, and all of the wires that pass between the processing module and the barcode reader must be managed. However, typical bioptic reader assemblies do not have the space within the bioptic reader assembly for the required processing module and routing of the required cables.

SUMMARY

In an embodiment, the present invention is a bioptic reader assembly comprising a scale assembly, a bioptic barcode reader, and a video upgrade module. The scale assembly includes a support frame and a platter mounted to the support frame and has a width that is less than or equal to 11½ inches. The bioptic barcode reader is mounted to the support frame of the scale assembly and includes a housing having a lower housing portion positioned below the platter and an upper housing portion extending above the lower housing portion and above the platter, a set of optical components positioned within the housing, and a camera. The video upgrade module is positioned within the width of the scale assembly and within a height defined from a top surface of the platter to a bottom of the lower housing portion, the height being less than or equal to 4 inches, and is operatively connected to the bioptic barcode reader and in communication with the camera. The video upgrade module configured to process and interpret images received from the camera.

In another embodiment, the present invention is a method of integrating a video upgrade module into a bioptic reader assembly having a scale assembly and a bioptic barcode reader, the method comprising the steps of: positioning the video upgrade module within the bioptic reader assembly between the bioptic barcode reader and a support structure of the scale assembly, the video upgrade module positioned within a width of the scale assembly and within a height defined from a top surface of a platter of the scale assembly to a bottom of a housing of the bioptic barcode reader, the width being less than or equal to 11½ inches and the height being less than or equal to 4 inches; securing the video upgrade module to the bioptic reader assembly; and operatively connecting the video upgrade module to the bioptic barcode reader.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

FIG. 11 illustrates a bottom view of the bioptic reader assembly of FIG. 1 with the alternative video upgrade module position of FIG. 10.

Figure 1:
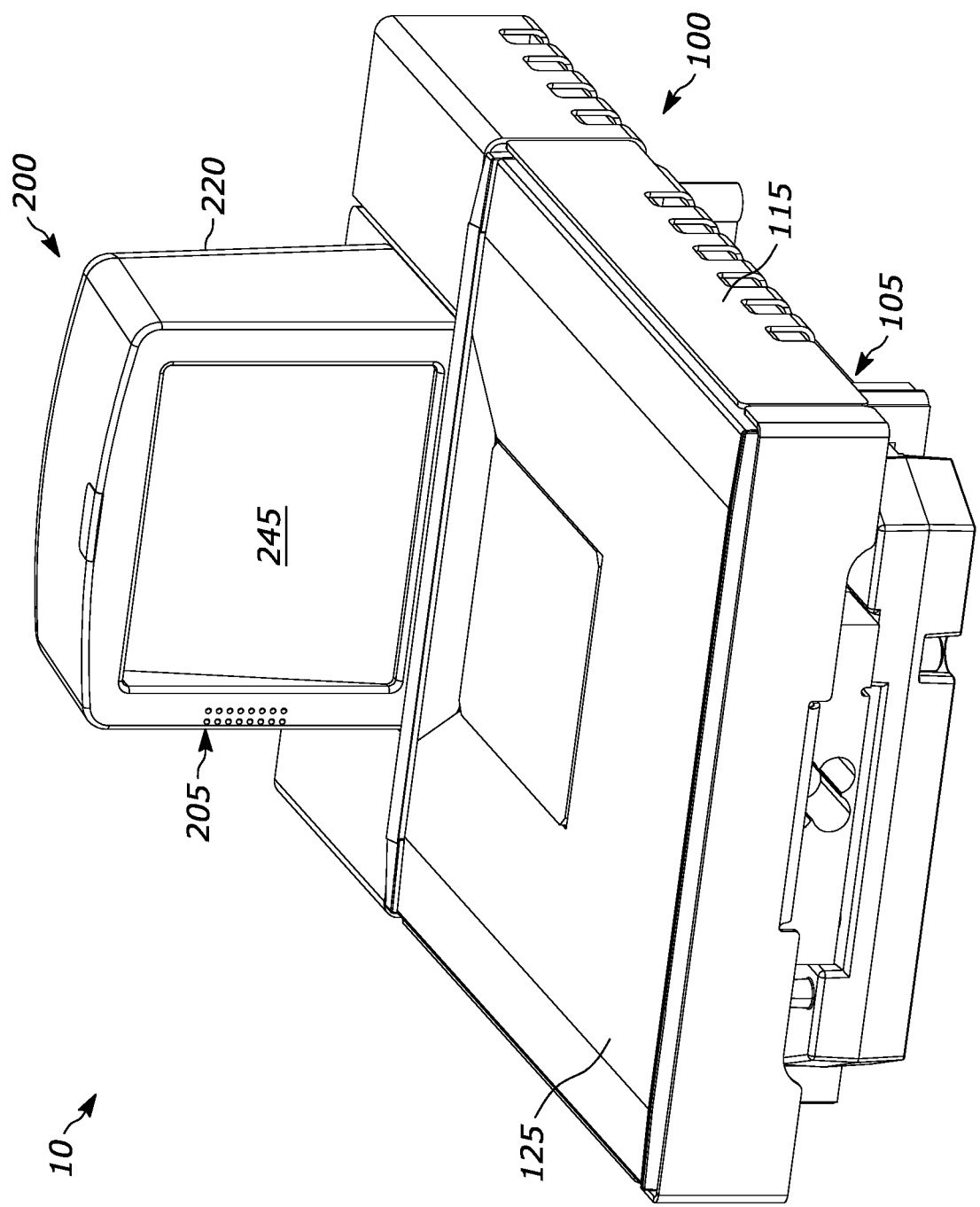
FIG. 1 illustrates a perspective view of an example bioptic reader assembly.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to bioptic reader assemblies that include video upgrade modules that can be used to receive images from a camera of a bioptic barcode reader and process and interpret the images, for example through one or more of object recognition, video monitoring for retail loss prevention, convolutional neural network capabilities, gesture recognition, video feed capabilities, and optical character recognition. In the examples shown, the video upgrade modules are external modules and are integrated within the bioptic reader assembly either within the footprint of the bioptic barcode reader or within open areas between the bioptic barcode reader and a scale assembly support structure of the bioptic reader assembly.

Figure 2:
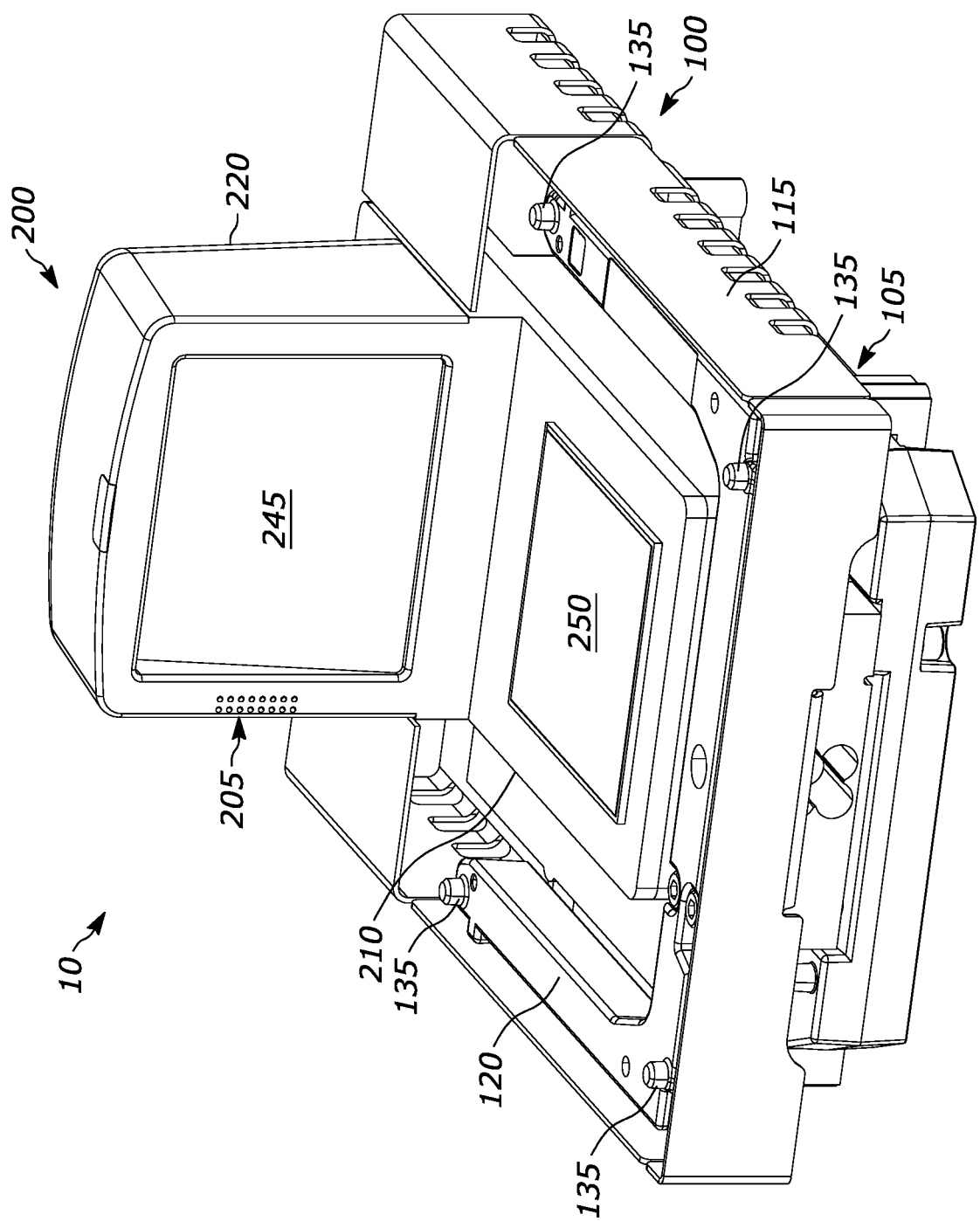
FIG. 2 illustrates a perspective view of the bioptic reader assembly of FIG. 1 with the platter removed.
Figure 3:
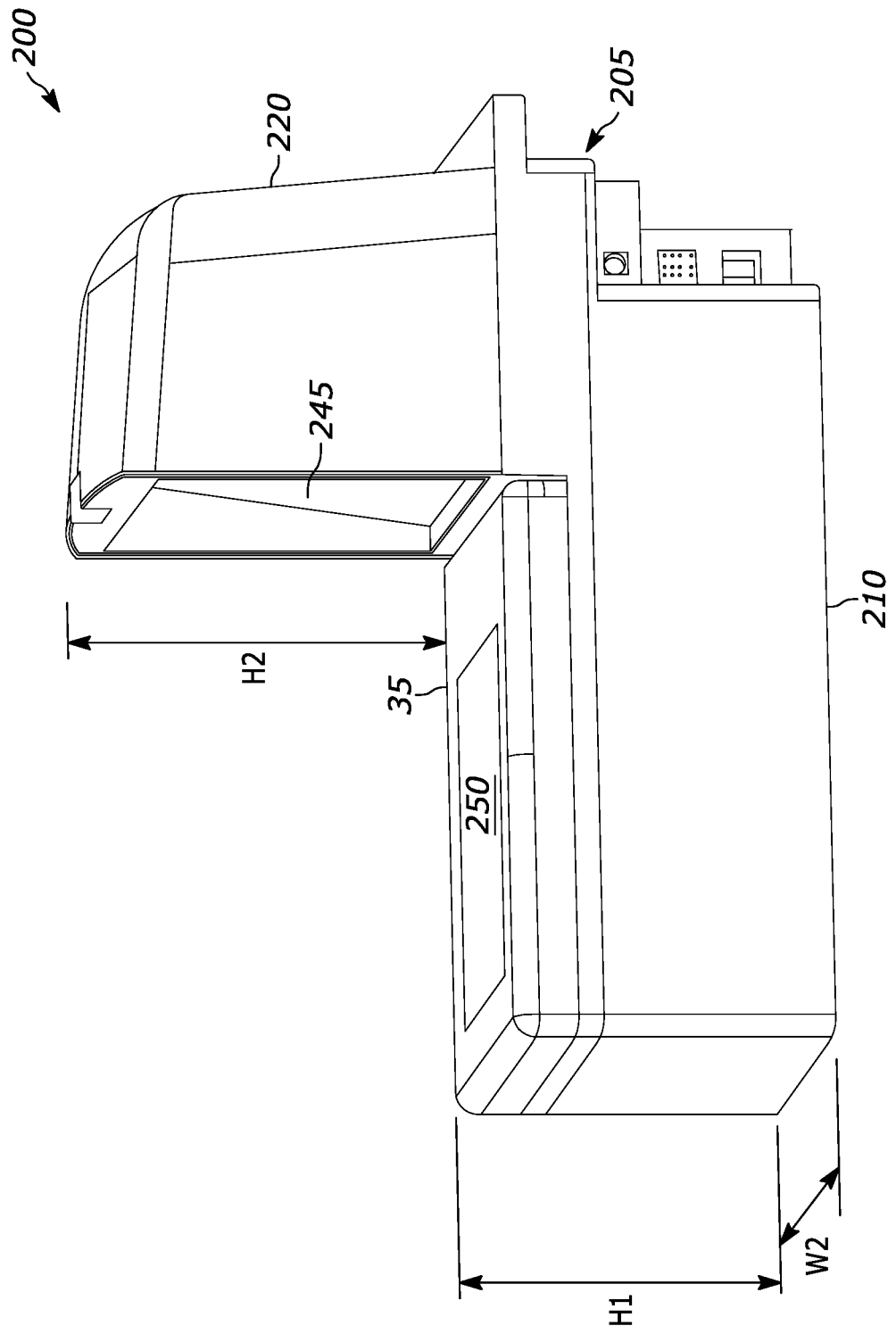
FIG. 3 illustrates a perspective view of the bioptic barcode reader of the bioptic reader assembly of FIG. 1.
Figure 4:
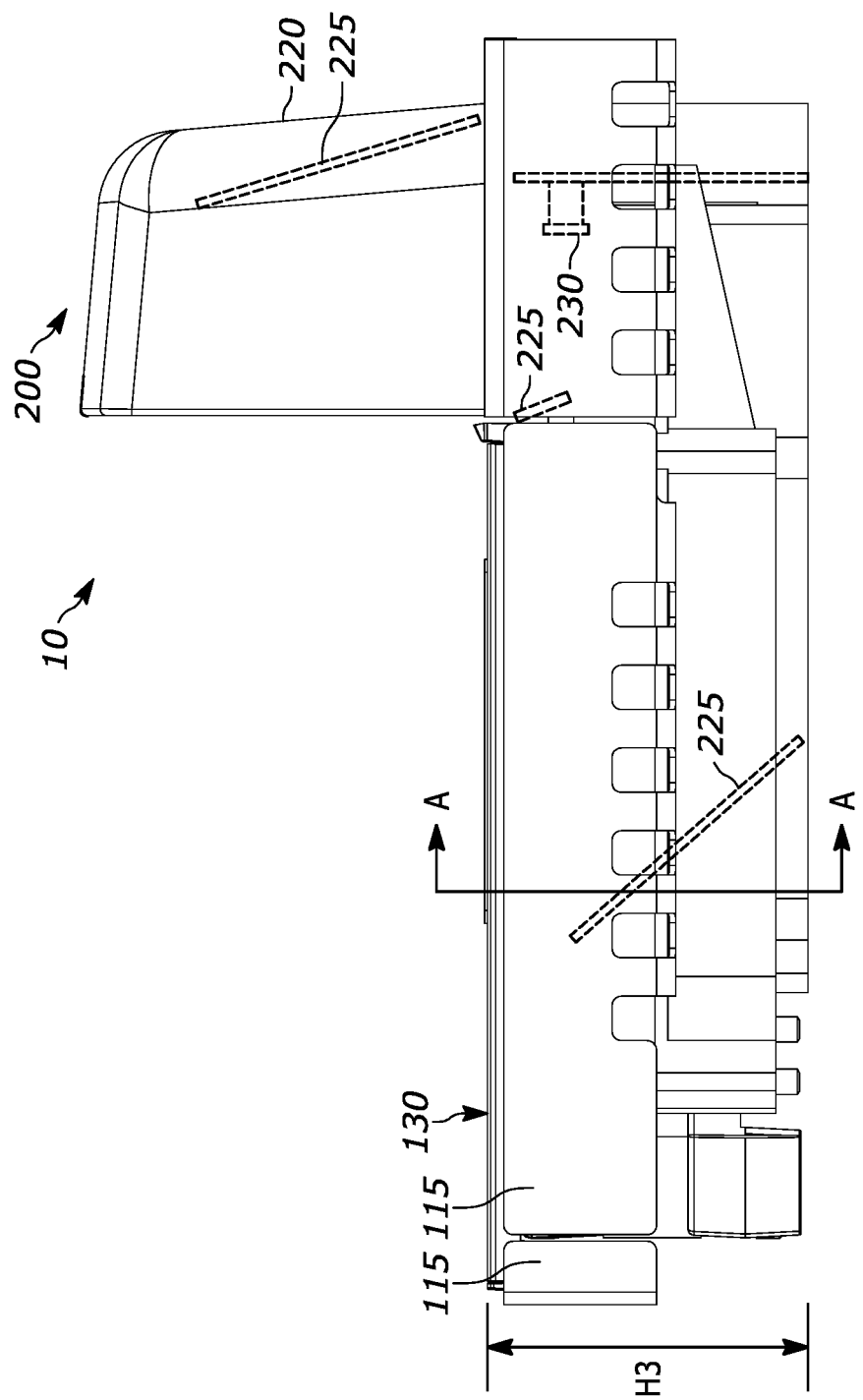
FIG. 4 illustrates a side view of the bioptic reader assembly of FIG. 1.
Figure 5:
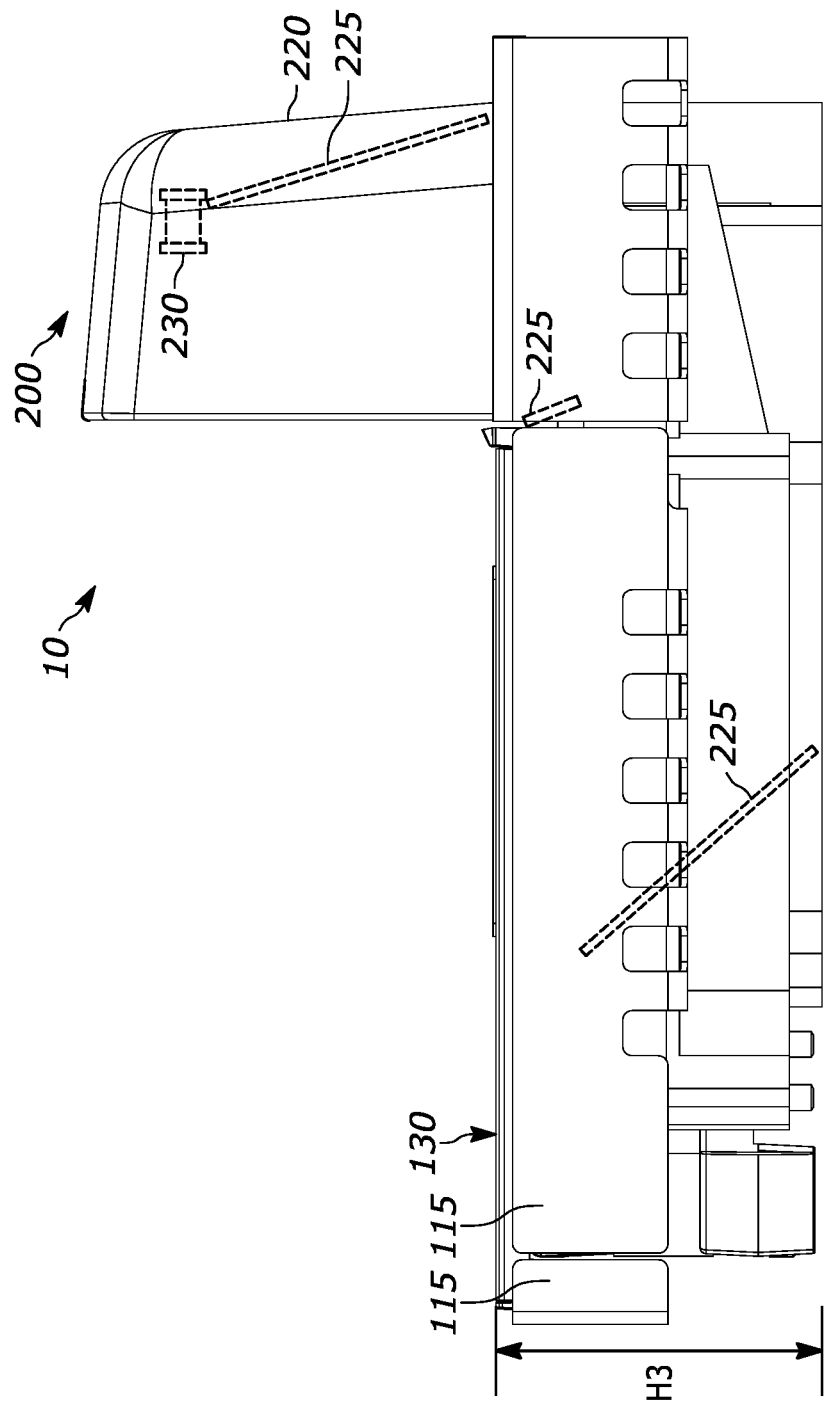
FIG. 5 illustrates a side view of the bioptic reader assembly of FIG. 1 with an alternative camera arrangement.

Referring to FIGS. 1-2, an example bioptic reader assembly 10 is shown that generally includes a scale assembly 100, a bioptic barcode reader 200 mounted within scale assembly 100, and an external video upgrade module 300 operatively connected to bioptic barcode reader 200.

Scale assembly 100 includes a support structure 105, which has a sheet metal frame 115 and a scale support rail 120, and load cells 135. A platter 125 is mounted to support structure 105, is supported by load cells 135, and is used to weigh an object that is placed on platter 125. In the example shown, scale assembly 100 has a width W1 that is less than or equal to 11½ inches.

Bioptic barcode reader 200 is mounted to support structure 105 and includes a housing 205 having a lower housing portion 210 positioned within scale assembly 100 and below platter 125 and an upper housing portion 220 extending above lower housing portion 210 and above platter 125. Upper housing portion 220 includes a generally upright window 245 and lower housing portion 210 includes a generally horizontal window 250. In the example shown, housing 205 preferably has a width W2 that is greater than or equal to 5 inches and less than or equal to 7 inches, lower housing portion 210 has a height H1 that is greater than or equal to 3 inches, and upper housing portion 220 has a height H2 that is greater than or equal to 4 inches and less than or equal to 6 inches, which provides a smaller footprint than typical bioptic barcode readers.

A set of optical components 225, such as mirrors, and a camera 230 are positioned within housing 205. Camera 230, which is preferably a 2 megapixel color camera, can be a dedicated camera for use by video upgrade module 300 or can be a camera already used in bioptic barcode reader 200 such that camera 230 is the only camera in bioptic barcode reader 200 and is configured to capture barcode images for decoding and to capture images for video processing by video upgrade module 300.

Video upgrade module 300 is operatively connected to bioptic barcode reader 200, for example through cable 305, and is in communication with camera 230 and is configured to receive images from camera 230 and process and interpret the images, for example through one or more of object recognition, video monitoring for retail loss prevention, convolutional neural network capabilities, gesture recognition, video feed capabilities, and optical character recognition. Video upgrade module 300 can have its own dedicated housing, or could be a printed circuit board that is mounted to housing 205 of bioptic barcode reader 200 and/or support structure 105 with a cover that seals the printed circuit board and is positioned within width W1 of scale assembly 100 and within a height H3 that is defined from a top surface 130 of platter 125 to a bottom 215 of lower housing portion 210, which is preferably less than or equal to 4 inches.

Figure 6:
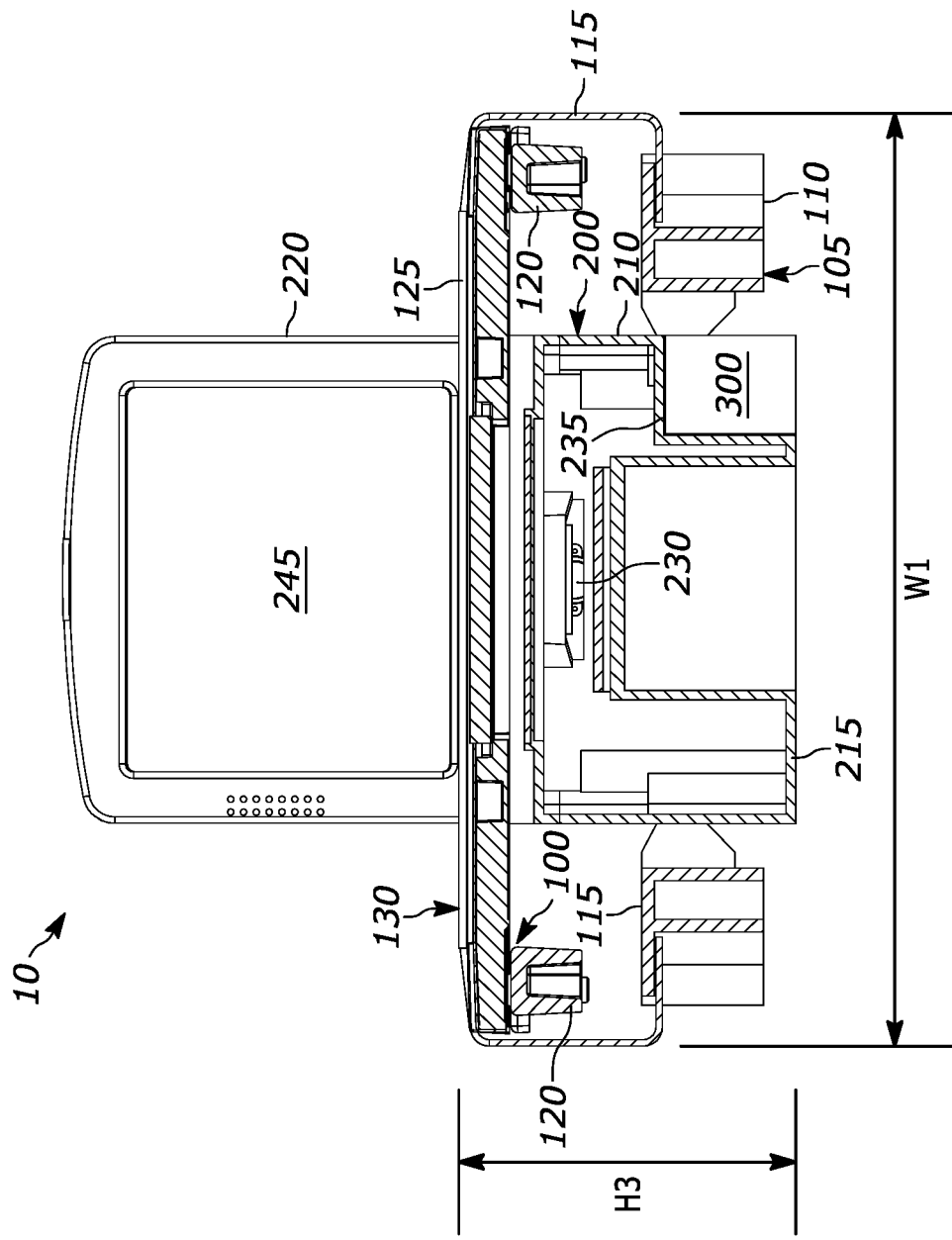
FIG. 6 illustrates a cross-sectional view of the bioptic reader assembly of FIG. 1 taken along line A-A of FIG. 4.
Figure 7:
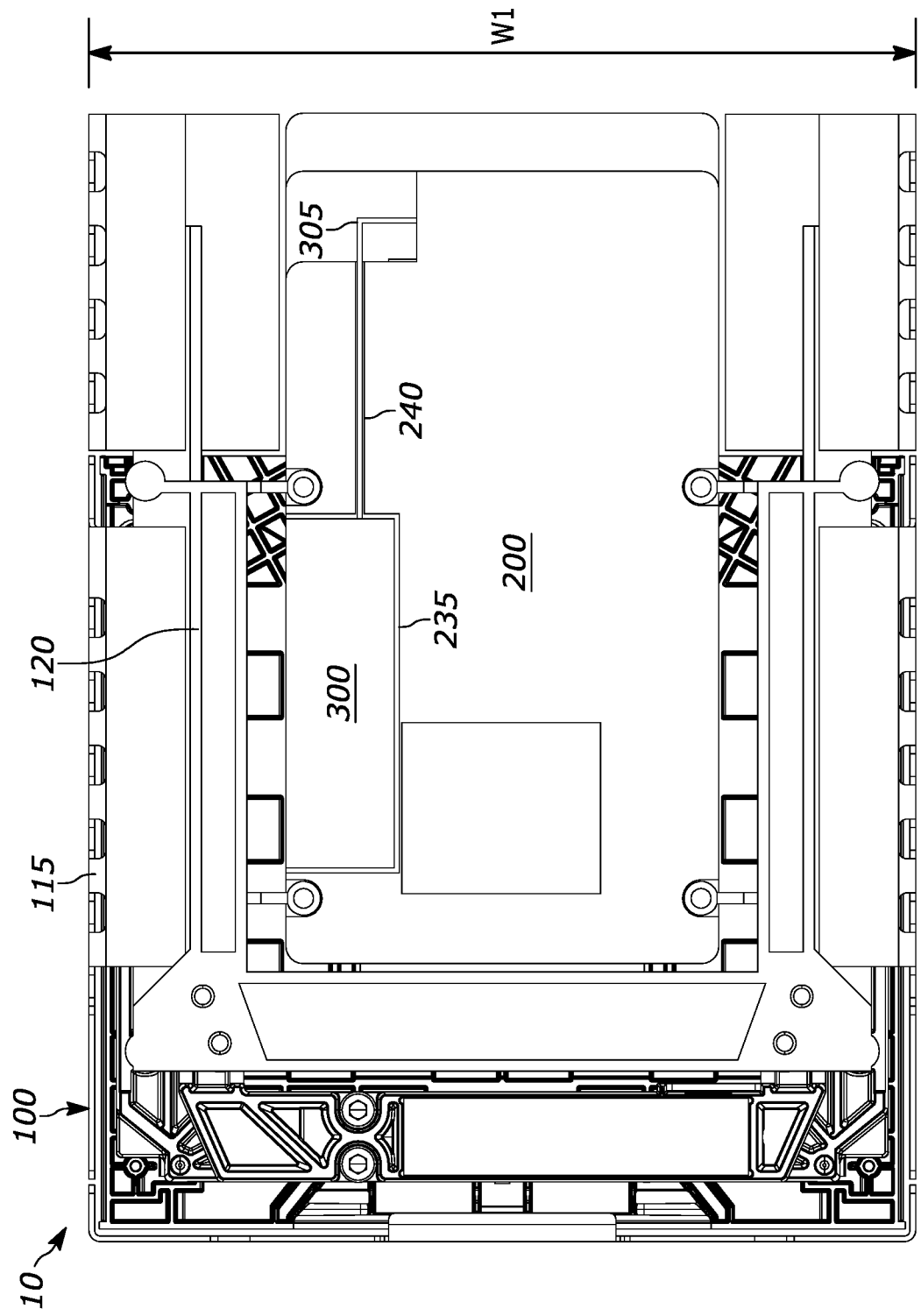
FIG. 7 illustrates a bottom view of the bioptic reader assembly of FIG. 1.

As shown in FIGS. 6-7, video upgrade module 300 can be positioned within an external pocket 235 defined in housing 205 of bioptic barcode reader 200 and secured to housing 205, for example by bolting or snapping video upgrade module 300 into place. In this example, video upgrade module 300 will fit completely within width W2 of housing 205 of bioptic barcode reader 200, such that bioptic barcode reader 200 and video upgrade module 300 can be inserted into and removed from support structure 105 of scale assembly 100 as a single unit, making installation and repair easier. With video upgrade module 300 positioned within pocket 235, cable 305 can be routed through a recess 240 formed in housing 205 of bioptic barcode reader 200, which simplifies cable guidance.

To integrate video upgrade module 300 into bioptic reader assembly 10 as shown in FIGS. 6-7, video upgrade module 300 is positioned within external pocket 235 in housing 205 of bioptic barcode reader 200 and secured to housing 205 of bioptic barcode reader 200. Preferably, when positioned in pocket 235, video upgrade module 300 does not extend past any exterior surfaces of housing 205. Bioptic barcode reader 200 and video upgrade module 300 are then inserted into support structure 105 of scale assembly 100 as a single unit so that video upgrade module is positioned between bioptic barcode reader 200 and support structure 105 of scale assembly 100 and within width W1 and height H3. Video upgrade module 300 is also operatively connected to bioptic barcode reader 200 via cable 305, which is routed with recess 240 in housing 205 of bioptic barcode reader 200.

Figure 8:
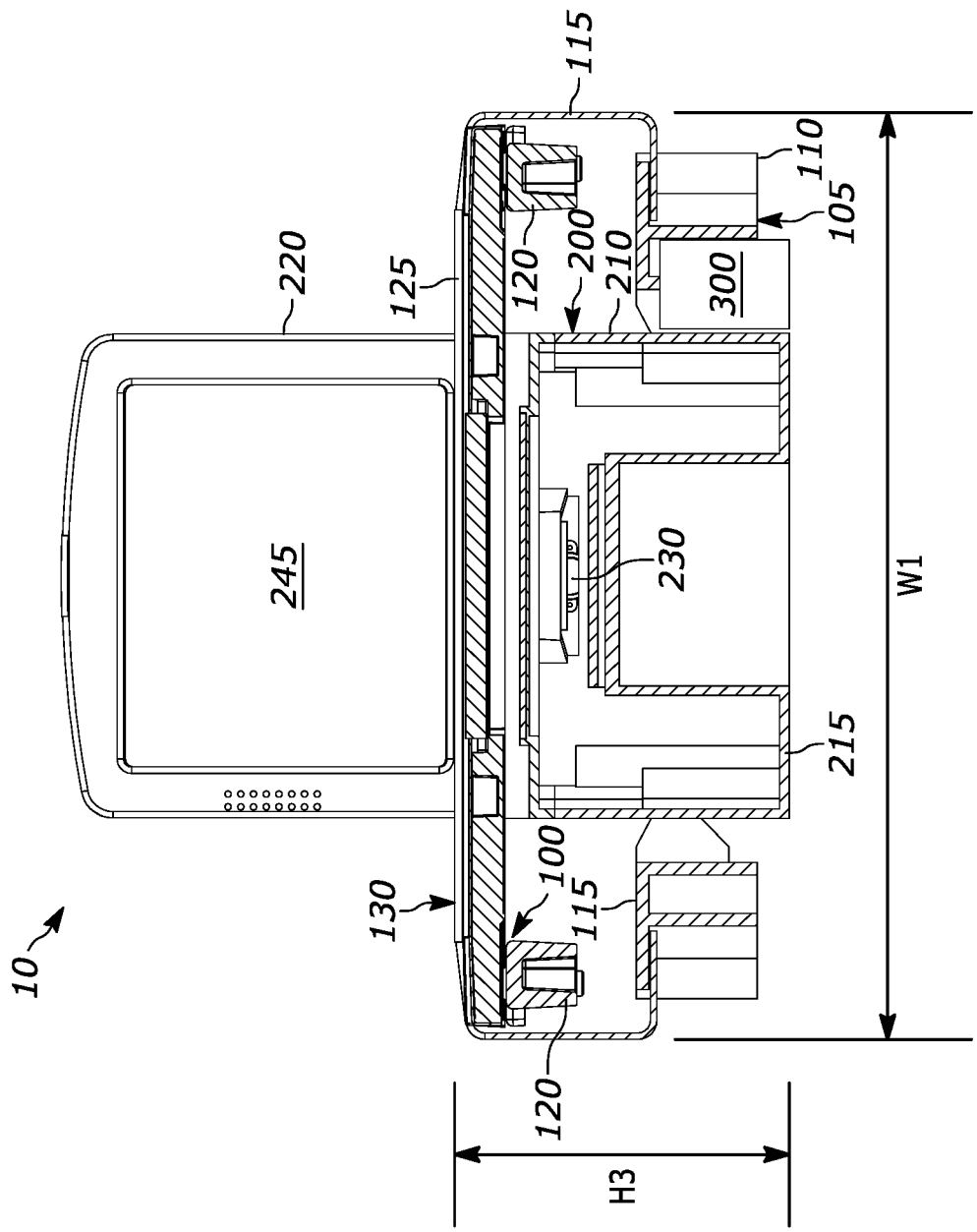
FIG. 8 illustrates a cross-sectional view of the bioptic reader assembly of FIG. 1 taken along line A-A of FIG. 4 with an alternative video upgrade module position.
Figure 9:
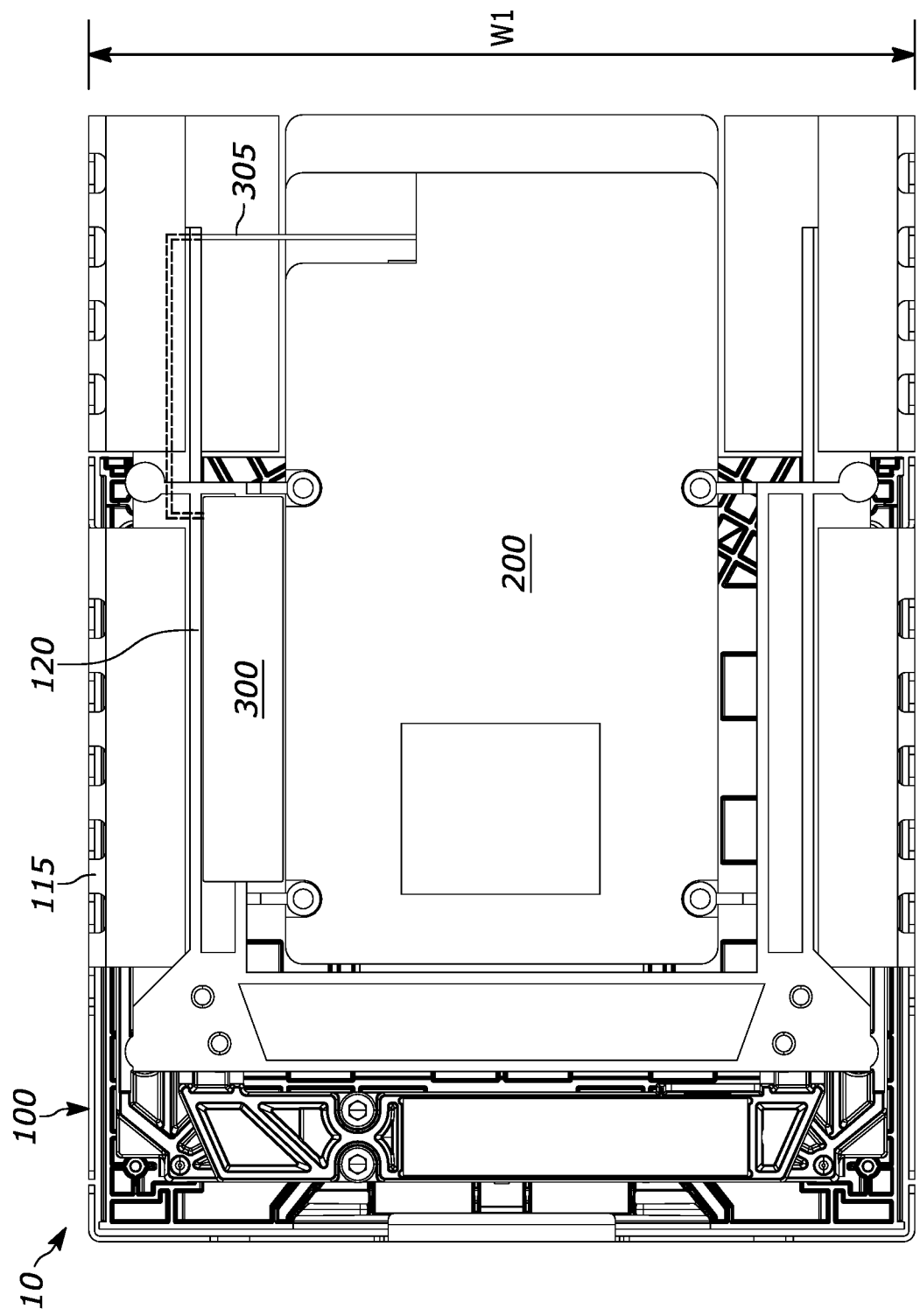
FIG. 9 illustrates a bottom view of the bioptic reader assembly of FIG. 1 with the alternative video upgrade module position of FIG. 8.

Alternatively, as shown in FIGS. 8-9, external pocket 235 in housing 205 of bioptic barcode reader 200 is not required and video upgrade module 300 can be positioned between housing 205 of bioptic barcode reader 200 and support structure 105 and secured to support structure 105 or housing 205, again by any appropriate method such as bolting or snapping video upgrade module 300 into place. With video upgrade module 300 positioned between housing 205 and support structure 105, cable 305 can be routed within support structure 105, for example, between sheet metal frame 115 and scale support rail 120.

To integrate video upgrade module 300 into bioptic reader assembly 10 as shown in FIGS. 8-9, bioptic barcode reader 200 is inserted into and secured to support structure 105 of scale assembly 100 and video upgrade module 300 is positioned within bioptic reader assembly 10 between bioptic barcode reader 200 and support structure 105 of scale assembly 100 and within width W1 and height H3, for example, by inserting video upgrade module 300 through bottom 110 of support structure 105. Once positioned, video upgrade module is secured to support structure 105 or to housing 205. Video upgrade module 300 is also operatively connected to bioptic barcode reader 200 via cable 305, which is routed within support structure 105, for example, between sheet metal frame 115 and scale support rail 120.

Figure 10:
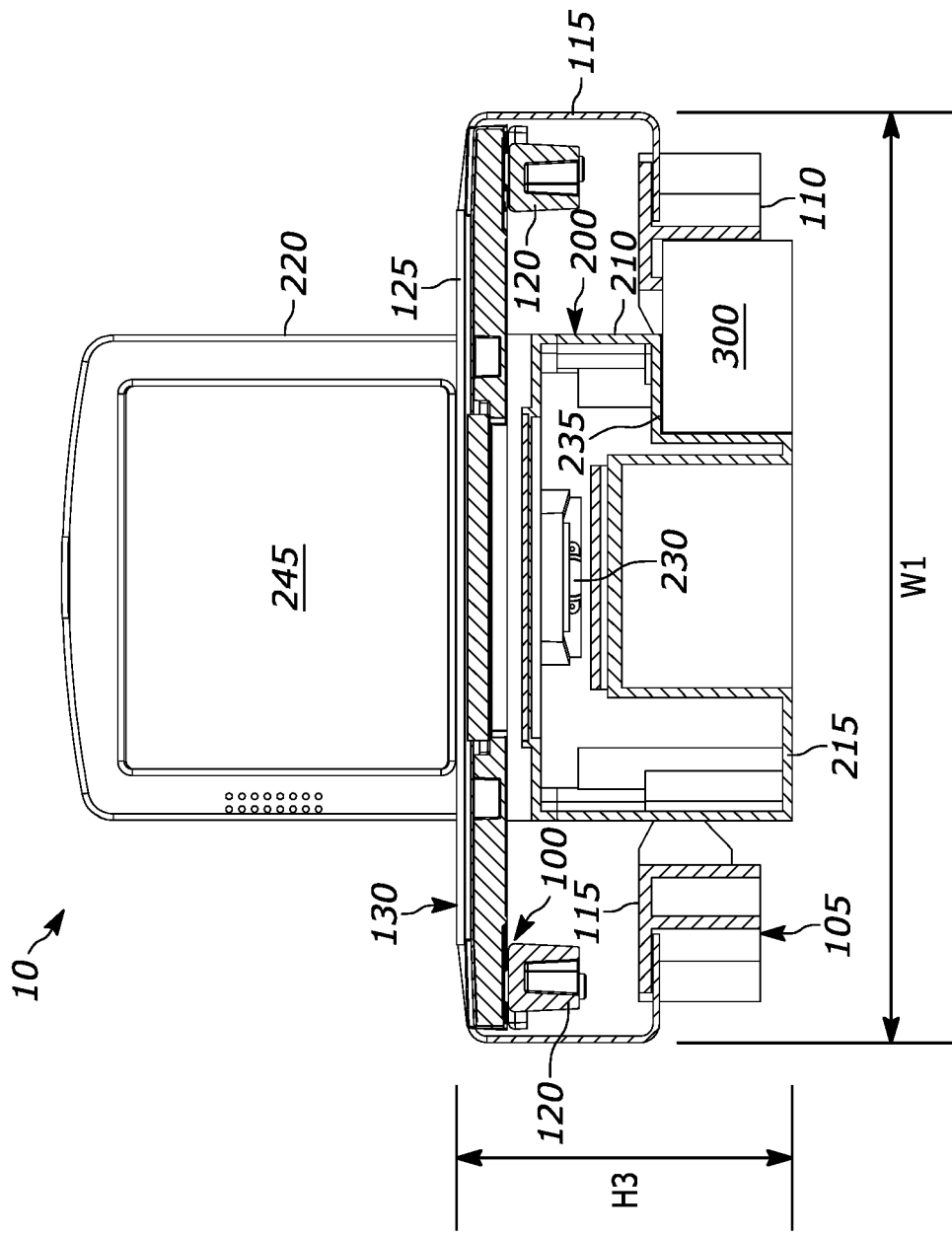
FIG. 10 illustrates a cross-sectional view of the bioptic reader assembly of FIG. 1 taken along line A-A of FIG. 4 with another alternative video upgrade module position.

In addition, as shown in FIGS. 10-11, video upgrade module 300 can be positioned within an external pocket 235 defined in housing 205 of bioptic barcode reader 200 and extend outward into support structure 105. In this example, video upgrade module 300 can be secured to either housing 205 or support structure 105, for example by bolting or snapping video upgrade module 300 into place. Positioning video upgrade module 300 in this manner allows for the use of a larger module, if required. With video upgrade module 300 positioned as shown, cable 305 can be routed through a recess 240 formed in housing 205 of bioptic barcode reader 200, which simplifies cable guidance.

To integrate video upgrade module 300 into bioptic reader assembly 10 as shown in FIGS. 10-11, bioptic barcode reader 200 is inserted into and secured to support structure 105 of scale assembly 100 and video upgrade module 300 is positioned between bioptic barcode reader 200 and support structure 105 of scale assembly 100 and within width W1 and height H3, for example, by inserting video upgrade module 300 through bottom 110 of support structure 105. Once positioned, video upgrade module is secured to support structure 105 or to housing 205. Video upgrade module 300 is also operatively connected to bioptic barcode reader 200 via cable 305, which is routed with recess 240 in housing 205 of bioptic barcode reader 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bioptic reader assembly, comprising:
   a scale assembly including a support frame and a platter mounted to the support frame, the scale assembly having a width;
   a bioptic barcode reader mounted to the support frame of the scale assembly, the bioptic barcode reader including a housing having a lower housing portion positioned below the platter and an upper housing portion extending above the lower housing portion and above the platter, a set of optical components positioned within the housing, and a camera; and
   a video upgrade module operatively connected to the bioptic barcode reader and in communication with the camera, the video upgrade module configured to process and interpret images received from the camera; wherein
   the video upgrade module is positioned within the width of the scale assembly and within a height defined from a top surface of the platter to a bottom of the lower housing portion.

2. The bioptic reader assembly of claim 1, wherein the housing of the bioptic barcode reader defines an external pocket and the video upgrade module is positioned within the pocket and secured to the housing.

3. The bioptic reader assembly of claim 2, wherein the bioptic barcode reader and the video upgrade module can be removed from the support structure of the scale assembly as a single unit.

4. The bioptic reader assembly of claim 1, wherein the video upgrade module is positioned between the housing of the bioptic barcode reader and the support structure and is secured to the support structure.

5. The bioptic reader assembly of claim 1, wherein the camera is a 2 megapixel color camera.

6. The bioptic reader assembly of claim 1, wherein the camera is the only camera in the bioptic barcode reader and the camera is configured to capture barcode images for decoding and configured to capture images for video processing by the video upgrade module.

7. The bioptic reader assembly of claim 1, wherein the video upgrade module is configured for one or more of object recognition, video monitoring for retail loss prevention, convolutional neural network capabilities, gesture recognition, video feed capabilities, and optical character recognition.

8. The bioptic reader assembly of claim 1, wherein the video upgrade module is operatively connected to the bioptic barcode reader via a cable that is routed within the support structure.

9. The bioptic reader assembly of claim 8, wherein the cable is routed between a sheet metal frame of the support structure and a scale support rail of the support structure.

10. The bioptic reader assembly of claim 1, wherein the video upgrade module is operatively connected to the bioptic barcode reader via a cable that is routed through a recess in the housing of the bioptic barcode reader.

11. The bioptic reader assembly of claim 1, wherein:
the housing has a width that is greater than or equal to 5 inches and less than or equal to 7 inches;
the lower housing portion has a height that is greater than or equal to 3 inches; and
the upper housing portion has a height that is greater than or equal to 4 inches and less than or equal to 6 inches.

12. A method of integrating a video upgrade module into a bioptic reader assembly having scale assembly and a bioptic barcode reader, the method comprising the steps of:
positioning the video upgrade module within the bioptic reader assembly between the bioptic barcode reader and a support structure of the scale assembly, the video upgrade module positioned within a width of the scale assembly and within a height defined from a top surface of a platter of the scale assembly to a bottom of a housing of the bioptic barcode reader;
securing the video upgrade module to the bioptic reader assembly; and
operatively connecting the video upgrade module to the bioptic barcode reader.

13. The method of claim 12, wherein the housing of the bioptic barcode reader defines an external pocket and the video upgrade module is positioned within the pocket and secured to the housing.

14. The method of claim 13, wherein the bioptic barcode reader and the video upgrade module are inserted into the support structure of the scale assembly as a single unit.

15. The method of claim 12, wherein the video upgrade module is inserted through a bottom of the support structure and secured to the support structure.

16. The method of claim 12, wherein the video upgrade module is configured for one or more of object recognition, video monitoring for retail loss prevention, convolutional neural network capabilities, gesture recognition, video feed capabilities, and optical character recognition.

17. The method of claim 12, wherein the video upgrade module is operatively connected to the bioptic barcode reader via a cable that is routed within the support structure.

18. The method of claim 17, comprising routing the cable between a sheet metal frame of the support structure and a scale support rail of the support structure.

19. The method of claim 12, wherein the video upgrade module is operatively connected to the bioptic barcode reader via a cable that is routed within a recess defined in the housing of the bioptic barcode reader.

20. The method of claim 12, wherein:
the housing has a width that is greater than or equal to 5 inches and less than or equal to 7 inches;
the lower housing portion has a height that is greater than or equal to 3 inches; and
the upper housing portion has a height that is greater than or equal to 4 inches and less than or equal to 6 inches.

\* \* \* \* \*